US012136377B2

(12) United States Patent
Kim et al.

(10) Patent No.: US 12,136,377 B2
(45) Date of Patent: Nov. 5, 2024

(54) DISPLAY PANEL DRIVING DEVICE AND DISPLAY PANEL DRIVING METHOD

(71) Applicant: Samsung Electronics Co., Ltd., Suwon-si (KR)

(72) Inventors: Minsung Kim, Suwon-si (KR); Seung-Hoon Baek, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/061,588

(22) Filed: Dec. 5, 2022

(65) Prior Publication Data

US 2024/0021129 A1 Jan. 18, 2024

(30) Foreign Application Priority Data

Jul. 14, 2022 (KR) ........................ 10-2022-0086979

(51) Int. Cl.
*G09G 3/20* (2006.01)

(52) U.S. Cl.
CPC ..... *G09G 3/2007* (2013.01); *G09G 2310/061* (2013.01); *G09G 2310/08* (2013.01); *G09G 2320/0247* (2013.01); *G09G 2320/0673* (2013.01); *G09G 2330/021* (2013.01); *G09G 2330/028* (2013.01)

(58) Field of Classification Search
CPC ........... G09G 3/2007; G09G 2310/061; G09G 2310/08; G09G 2320/0247; G09G 2320/0673; G09G 2330/021; G09G 2330/028
See application file for complete search history.

(56) References Cited

U.S. PATENT DOCUMENTS

| | | | | |
|---|---|---|---|---|
| 6,466,191 | B1 | 10/2002 | Choi et al. | |
| 9,384,699 | B2 | 7/2016 | Park et al. | |
| 11,276,370 | B2 | 3/2022 | Kim et al. | |
| 2021/0201801 | A1 * | 7/2021 | Lee | G09G 3/3258 |

FOREIGN PATENT DOCUMENTS

| | | | |
|---|---|---|---|
| JP | 2013-073190 | A | 4/2013 |
| KR | 10-0819427 | B1 | 4/2008 |
| KR | 2019-0059625 | A | 5/2019 |

* cited by examiner

*Primary Examiner* — Kenneth Bukowski
(74) *Attorney, Agent, or Firm* — HARNESS, DICKEY & PIERCE, P.L.C.

(57) ABSTRACT

A driving device of a display panel includes a reference voltage generator, a capacitor circuit, and a gamma voltage generator. The reference voltage generator is configured to generate a maximum gamma voltage and a minimum gamma voltage. The capacitor circuit is configured to, response to receiving the first driving voltage, charge a first charge based on a voltage difference between a first driving voltage and the maximum gamma voltage and charge a second charge based on a voltage difference between the first driving voltage and the minimum gamma voltage. The capacitor circuit is configured to, in response to receiving a second driving voltage, output a first gamma reference voltage and a second gamma reference voltage. The gamma voltage generator is configured to generate a plurality of gamma voltages based on the first gamma reference voltage and the second gamma reference voltage.

20 Claims, 13 Drawing Sheets

10

DISPLAY PANEL DRIVING DEVICE AND DISPLAY PANEL DRIVING METHOD

CROSS-REFERENCE TO RELATED APPLICATION

This application claims priority to and the benefit of Korean Patent Application No. 10-2022-0086979 filed in the Korean Intellectual Property Office on Jul. 14, 2022, the entire contents of which are incorporated herein by reference.

BACKGROUND

(a) Field

The inventive concepts relate to driving apparatuses of a display panel, and driving methods of the display panel.

(b) Description of the Related Art

In general, in the manufacturing process of display devices, setting a gamma voltage to improve image quality and correcting luminance for image data signals according to gamma voltage settings are essential.

The gamma voltage setting process is a module unit process that sets the gamma voltage for each gray such that the luminance for each gray becomes a 2.2 gamma curve. In general, the 2.2 gamma curve has luminescence characteristics that are optimally recognized by the human eye.

The luminance correction process for the input data is performed with the gamma voltage determined through the gamma voltage setting process as a reference.

To set the gamma voltage, a test device is connected to the display panel, and a reference pixel driving voltage is applied to the display panel through a DC-DC converter of the test device. Thus, the gamma voltage for all grays are set such that the luminance for each gray becomes the 2.2 gamma curve.

In addition, after the module process of the display device that sets the gamma voltage, the DC-DC converter provided in the display device supplies a driving voltage to the display panel in the finished product state.

SUMMARY

Some example embodiments provide a driving device of a display panel that can reduce power consumption and reduce flicker noise of active elements in a low frequency section, and a driving method thereof.

Some example embodiments provide a driving device of a display panel that can reduce noise, and a driving method thereof.

A driving device of a display panel according to some example embodiments to solve such a technical object, may include: a reference voltage generator, a capacitor circuit, and a gamma voltage generator. The reference voltage generator may be configured to generate a maximum gamma voltage and a minimum gamma voltage. The capacitor circuit may include a first end configured to receive an input of a first driving voltage or a second driving voltage, a second end configured to receive an input of the maximum gamma voltage, and a third end configured to receive an input of the minimum gamma voltage. The capacitor circuit may be configured to charge a first charge based on a voltage difference between the first driving voltage and the maximum gamma voltage and charge a second charge based on a voltage difference between the first driving voltage and the minimum gamma voltage, in response to receiving the first driving voltage via the first end. The capacitor circuit may be configured to output a first gamma reference voltage and a second gamma reference voltage to the second end and the third end, respectively, in response to receiving the second driving voltage via the first end. The gamma voltage generator may be configured to generate a plurality of gamma voltages based on the first gamma reference voltage and the second gamma reference voltage.

A driving method of a display panel according to some example embodiments may include: charging a first charge in a first capacitor and charging a second charge in a second capacitor using a first driving voltage; coupling a second driving voltage to each of the first capacitor and the second capacitor; and generating a gamma voltage based on an output voltage of the first capacitor and an output voltage of the second capacitor.

A driving device of a display panel according to some example embodiments may include: a gamma voltage generator that is connected between a first node and a second node, and is configured to generate plurality of gamma voltages based on a voltage of the first node and a voltage of the second node; a first capacitor connected between the first node and a third node; a second capacitor connected between the second node and the third node; a first switch that is connected to the third node, and is configured to switch between a fourth node that is configured to receive a first driving voltage and a fifth node that is configured to receive a second driving voltage; a second switch connected between the first node and a sixth node that is configured to receive a maximum gamma voltage; and a third switch connected between the second node and a seventh node that is configured to receive a minimum gamma voltage.

The first switch may include a fourth switch connected between the third node and the fourth node, and a fifth switch connected between the third node and the fifth node.

DETAILED DESCRIPTION

Figure 1:
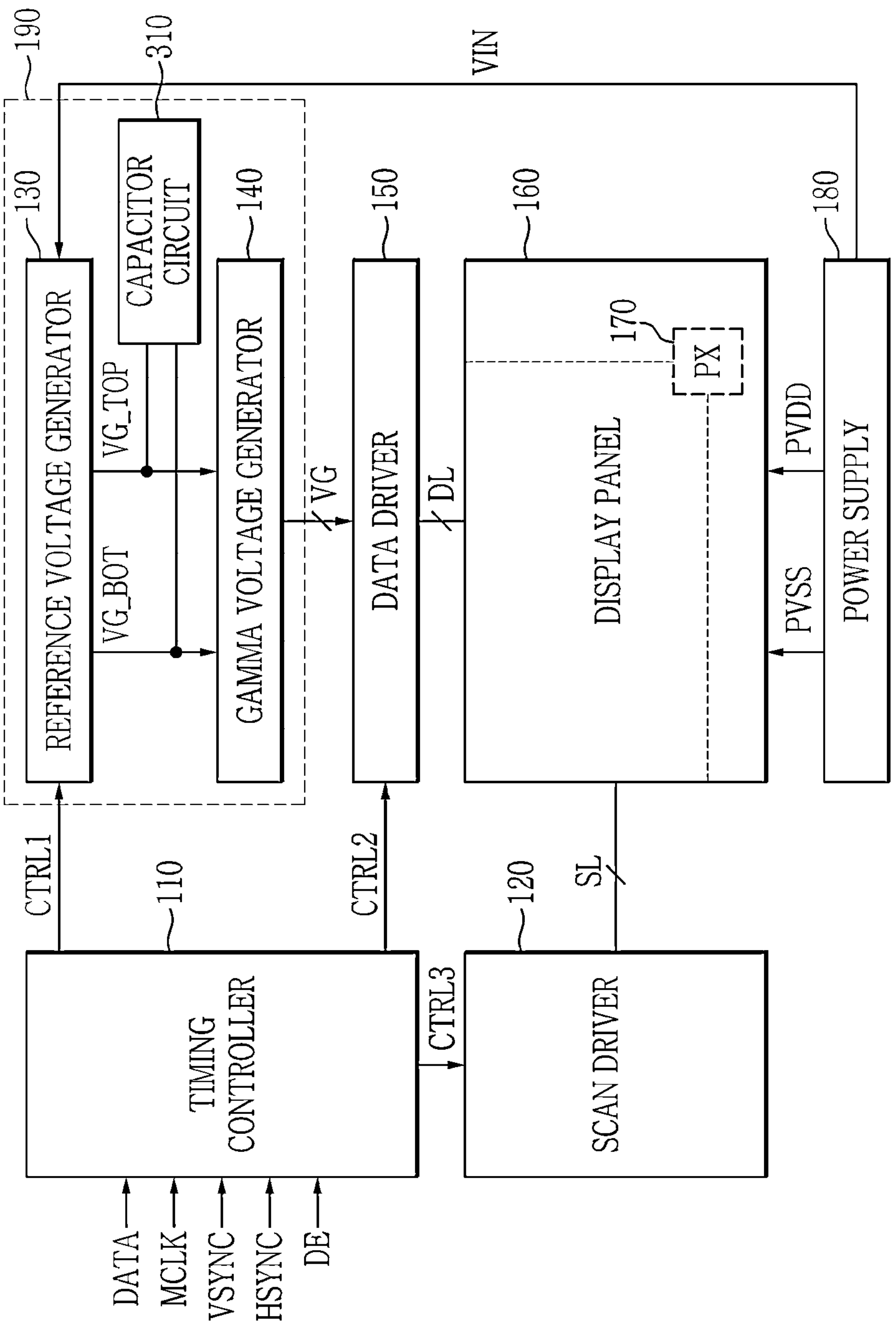
FIG. 1 is a schematic block diagram of a display device according to some example embodiments.

In the following detailed description, some example embodiments of the present inventive concepts have been shown and described, simply by way of illustration. As those skilled in the art would realize, some example embodiments may be modified in various different ways, all without departing from the spirit or scope of the present inventive concepts.

Accordingly, the drawings and description are to be regarded as illustrative in nature and not restrictive. Like reference numerals designate like elements throughout the specification. In the flowchart described with reference to the drawings, the order of operations may be changed, several operations may be merged, some operations may be divided, and specific operations may not be performed.

In addition, expressions written in the singular may be interpreted as singular or plural unless explicit expressions such as “one” or “single” are used. Terms including ordinal numbers such as first, second, and the like may be used to describe various configurations elements, but constituent elements are not limited by these terms. These terms may be used for the purpose of distinguishing one constituent element from other constituent elements.

FIG. 1 is a schematic block diagram of a display device according to some example embodiments.

Referring to FIG. 1, a display device 10 may include a timing controller 110, a scan driver 120, a reference voltage generator 130, a gamma voltage generator 140, a data driver 150, a display panel 160, a power supply 180, and a capacitor circuit 310. In some example embodiments, as shown in FIG. 1, the reference voltage generator 130 and the gamma voltage generator 140 may be independently implemented as driving devices outside the data driver 150. As shown, in some example embodiments the reference voltage generator 130, the capacitor circuit 310, and the gamma voltage generator 140 may collectively comprise a driving device 190 of a display panel 160. In some example embodiments, the reference voltage generator 130 and the gamma voltage generator 140 may be implemented inside the data driver 150. In some example embodiments, the driving device 190 may include the data driver 150. In some example embodiments, where the reference voltage generator 130 and the gamma voltage generator 140 are implemented inside the data driver 150, the driving device 190 may include the capacitor circuit and the data driver 150 which is implementing the reference voltage generator 130 and the gamma voltage generator 140. In some example embodiments, the reference voltage generator 130, the capacitor circuit 310, and the gamma voltage generator 140 may be implemented inside the data driver 150, such that the driving device 190 may include the data driver 150 and/or may be implemented by the data driver 150. In some example embodiments, the reference voltage generator 130 may be implemented inside the power supply 180.

The timing controller 110 may receive an input control signal for controlling an input video signal DATA from an image source such as an external graphics device and controlling display of the input video signal DATA.

The input video signal DATA contains luminance information of (e.g., luminance information associated with) each of a plurality of pixels PX 170 of the display panel 160, and the luminance may have a gray of a particular (or, in some example embodiments, predetermined) number (e.g., 1024 ($=2^{10}$), 256 ($=2^8$), or 64 ($=2^6$)). The input control signal may include a main clock signal MCLK, a vertical synchronization signal VSYNC, a horizontal synchronization signal HSYNC, and a data enable signal DE. The display panel 160 may receive a scan signal from the scan driver 120 through a plurality of scan lines SL to display an image. The scan signal may be formed of a combination of a scan-on voltage that turns on application of a data signal to the pixel 170 and a scan-off voltage that turns off the application of the data signal. The vertical synchronization signal VSYNC may indicate a start period in which the scan-on voltage is applied in one frame of an image, and the horizontal synchronization signal HSYNC may indicate a start period in which scan-on voltage is applied in one scan line SL of the display panel 160. One period of the vertical synchronization signal VSYNC may be one frame period. One period of the horizontal synchronization signal HSYNC and the data enable signal DE is one horizontal period of 1H.

The timing controller 110 may generate control signals CTRL1, CTRL2, and CTRL3 based on the input video signal DATA and the input control signal. The timing controller 110 may control the reference voltage generator 130, the data driver 150, and the scan driver 120 using the control signals CTRL1, CTRL2, and CTRL3.

The reference voltage generator 130 may receive the control signal CTRL1 from the timing controller 110. In addition, the reference voltage generator 130 may receive an input voltage VIN from the power supply 180. In FIG. 1, it is illustrated that the power supply 180 outputs the input voltage VIN to the reference voltage generator 130, but this is not restrictive, and a DC-DC converter and the like may output the input voltage VIN to the reference voltage generator 130. As described herein, outputting a signal, voltage or the like may include generating the signal, voltage, or the like, transmitting the signal, voltage, or the like, or both generating and transmitting the signal, voltage, or the like).

Figure 2:
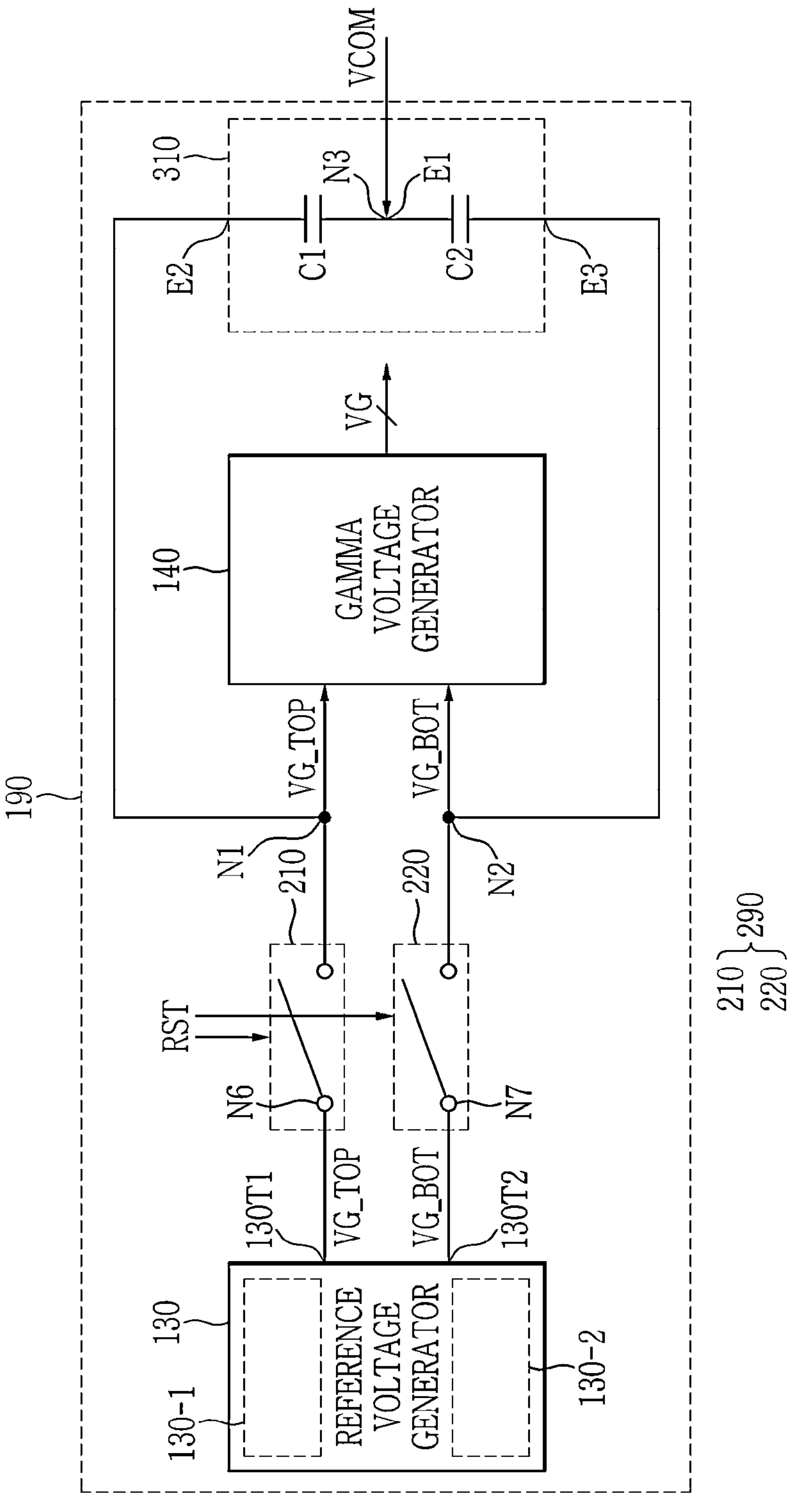
FIG. 2 is provided for description of operations of a reference voltage generator, a gamma voltage generator, and a capacitor circuit according to some example embodiments.

As shown in FIG. 2, the reference voltage generator 130 may include a first reference voltage generator 130-1 generating a maximum gamma signal VG_TOP and a second reference voltage generator 130-2 generating a minimum gamma signal VG_BOT. The maximum gamma signal VG_TOP may be referred to herein as a maximum gamma voltage. The minimum gamma signal VG_BOT may be referred to herein as a minimum gamma voltage. The reference voltage generator 130 may generate a maximum gamma signal VG_TOP and a minimum gamma signal VG_BOT based on the input voltage VIN and the control signal CTRL1. For example, the reference voltage generator 130 may include a resistor string, a decoder, a gamma amplifier, and the like, and may generate a maximum gamma signal VG_TOP and a minimum gamma signal VG_BOT. The maximum gamma signal VG_TOP and the minimum gamma signal VG_BOT may be voltages used to generate a plurality of gamma voltages VG that determine the luminance of each pixel of the display panel 160. The reference voltage generator 130 may transmit the maximum gamma signal VG_TOP and the minimum gamma signal VG_BOT to the gamma voltage generator 140. For example, the reference voltage generator 130 may output (e.g., transmit) the maximum gamma signal VG_TOP to one input terminal of the gamma voltage generator 140 and output (e.g., transmit) the minimum gamma signal VG_BOT to the other (e.g., another) input terminal of the gamma voltage generator 140. An output terminal (e.g., each output terminal) of the reference voltage generator 130 may be connected to the capacitor circuit 310. The reference voltage generator 130, the gamma voltage generator 140, and the capacitor circuit 310 may be disposed in parallel.

The capacitor circuit 310 may compensate for a variation between the driving voltage used in a gamma voltage setting process of the display device 10 and a first pixel driving voltage PVDD of the display device 10. For example, the capacitor circuit 310 may charge charges (e.g., generate charges) using a voltage having the same value (e.g., same magnitude) as the driving voltage used in the gamma voltage setting process. Thereafter, the capacitor circuit 310 may be coupled with the first pixel driving voltage PVDD while maintaining a constant amount (e.g., magnitude) of charges. Therefore, although noise occurs in the first pixel driving voltage PVDD, the maximum gamma signal VG_TOP and the minimum gamma signal VG_BOT are changed without distortion according to the change of the first pixel driving voltage PVDD such that the gamma voltage generator 140 can stably generate a gamma signal VG, which may be referred to as a gamma voltage, since each of the first capacitor C1 and the second capacitor C2 operates with a constant amount of charges Q1 and Q2, the change in the first pixel driving voltage PVDD caused by noise may be equally applied to the maximum gamma signal VG_TOP and the minimum gamma signal VG_BOT. Accordingly, the display device 10 may uniformly output a plurality of gamma voltages VG, thereby enabling stable image output with high quality and thus improving the performance (e.g., image display performance) of the display device 10 to display high-quality images via the pixels 170 of the display panel 160. In the past, when noise was generated in the first pixel driving voltage PVDD, distortion could occur in the maximum gamma signal VG_TOP and the minimum gamma signal VG_BOT output by the reference voltage generator 130. The capacitor circuit 310 will be described later with reference to FIG. 2, FIG. 4, and FIG. 5.

The gamma voltage generator 140 may generate a plurality of gamma voltages VG for a plurality of grays based on the maximum gamma signal VG_TOP and the minimum gamma signal VG_BOT, and output (e.g., transmit) the generated plurality of gamma voltages VG to the data driver 150. For example, the gamma voltage generator 140 may generate a plurality of gamma voltages VG by (e.g., based on) dividing between the maximum gamma signal VG_TOP and the minimum gamma signal VG_BOT. The maximum gamma signal VG_TOP may be a maximum gamma voltage that is a highest voltage among the plurality of gamma voltages VG, and the minimum gamma signal VG_BOT may be a minimum gamma voltage that is a lowest voltage among the plurality of gamma voltages VG. In some example embodiments, the plurality of gamma voltages VG may not include either of (e.g., may exclude both of) the maximum gamma signal VG_TOP and the minimum gamma signal VG_BOT.

In addition, the timing controller 110 may output the control signal CTRL2 to the data driver 150 based on the input video signal DATA. The control signal CTRL2 may include image data suitable for the operation condition of the display panel 160.

The data driver 150 may generate a data signal for image data by using the plurality of gamma voltages VG according to the control signal CTRL2, and may provide a data signal to the display panel 160 through a plurality of data lines DL. The data driver 150 may include a decoder and a source amplifier to generate the data signal from the plurality of gamma voltages VG.

The display panel 160 may receive the first pixel driving voltage PVDD and a second pixel driving voltage PVSS from the power supply 180 and display an image according to the plurality of data signals. The first pixel driving voltage PVDD and the second pixel driving voltage PVSS may be voltages for driving a plurality of pixels 170. The first pixel driving voltage PVDD may be higher (e.g., greater in magnitude) than the second pixel driving voltage PVSS.

The display panel 160 may include a wire for transmitting (e.g., configured to transmit) the first pixel driving voltage PVDD. The wire may have internal resistance. The first pixel driving voltage PVDD may be dropped by the internal resistance. Thus, as a distance from one side of the display panel 160 to which the first pixel driving voltage PVDD is provided is increased, the first pixel driving voltage PVDD in the display panel 160 may be lowered (e.g., reduced in voltage magnitude) due the internal resistance of the wire. To compensate for such a voltage drop (e.g., reduction in voltage magnitude), the gamma voltage generator 140 generates a plurality of gamma voltages VG and outputs (e.g., transmits) the gamma voltages VG to the data driver 150, and the data driver 150 generates a data signal using the plurality of gamma voltages VG and outputs the data signal to the display panel 160.

The display panel 160 may include a plurality of pixels 170. The display panel 160 may be connected to the scan driver 120 through a plurality of scan lines SL, and may be connected to the data driver 150 through the plurality of data lines DL. In this case, the number of the plurality of data lines DL may be p, and the number of the plurality of scan lines SL may be q. p and q may be integers of greater than 1 (e.g., p and q may each independently be any integer greater than 1). Since the plurality of pixels 170 are positioned at intersections of the plurality of scan lines SL and the plurality of data lines DL, the display panel 160 may include p*q pixels 170.

The scan driver 120 may provide (e.g., transmit) a scan signal to the display panel 160 through the plurality of scan lines SL according to the control signal CTRL3. The scan signal may be formed of (e.g., may comprise) a combination of a scan-on voltage and a scan-off voltage. The control signal CTRL3 may include a scan start signal, a clock signal, and the like. The scan start signal may be a signal that generates a first scan signal for displaying an image of one frame. The clock signal may be a synchronization signal for sequentially applying a scan signal to the plurality of scan lines SL.

Meanwhile, in some example embodiments, the display device 10 may further include a light emitting driver that outputs (e.g., transmits) a light emission control signal for controlling light emission of a plurality of pixels in the display panel 160.

Figure 3:
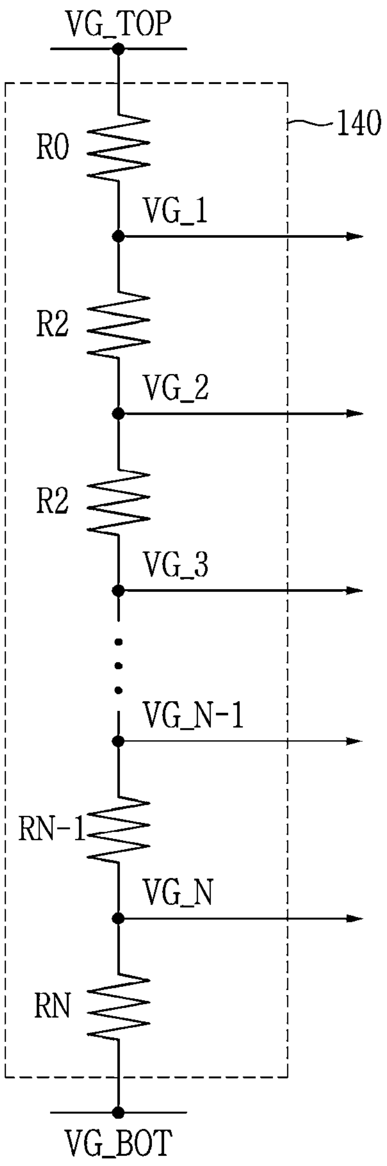
FIG. 3 shows a circuit diagram of the gamma voltage generator according to some example embodiments.
Figure 4:
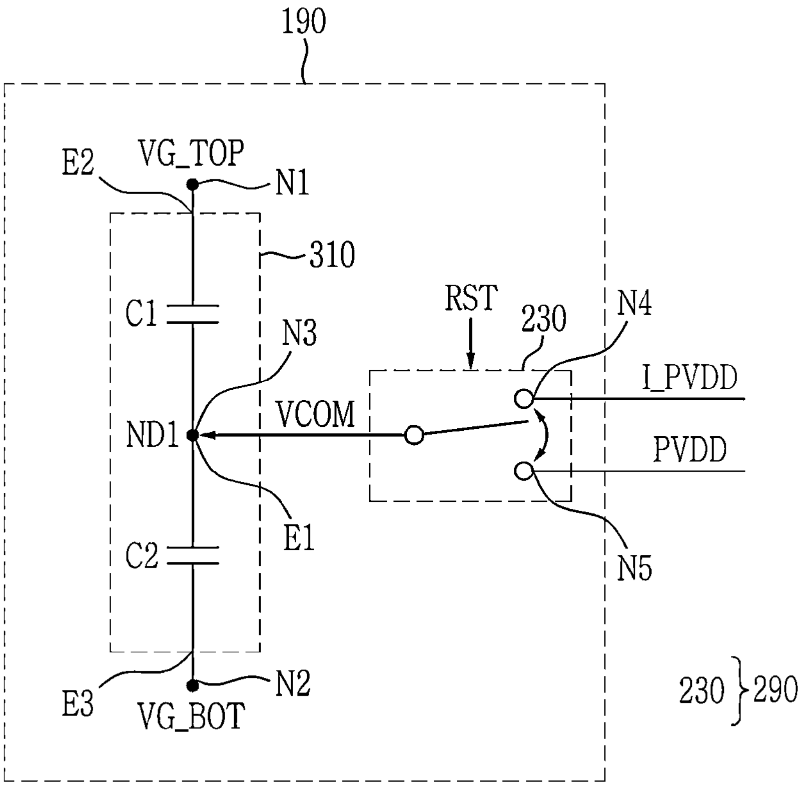
FIG. 4 is provided for description of operation of a switch according to some example embodiments.

FIG. 2 is provided for description of operation of a driving device 190 that includes the reference voltage generator, the gamma voltage generator, and the capacitor circuit according to some example embodiments, FIG. 3 shows a circuit diagram of the gamma voltage generator according to some example embodiments, and FIG. 4 is provided for description of operation of a switch according to some example embodiments.

Referring to FIG. 2, the display device 10 (e.g., the driving device 190 of the display device 10) may further include switches 210 and 220. The switches 210 and 220 include a switch 210 and a switch 220, and the reference voltage generator 130 and the gamma voltage generator 140 may be connected via the switch 210 and the switch 220. In the display device (e.g., the driving device 190) according to some example embodiments, the reference voltage generator 130, the gamma voltage generator 140, the switch 210, and the switch 220 may be arranged in an integrated circuit (IC), and the capacitor circuit 310 may be disposed in a substrate (e.g., a silicon substrate), for example outside the IC. In the display device 10 (e.g., the driving device 190) according to some example embodiments, the reference voltage generator 130, the gamma voltage generator 140, the switch 210, the switch 220, and the capacitor circuit 310 may be disposed in the IC. The capacitor circuit 310 may include a first capacitor C1 and a second capacitor C2. As shown, the switching circuit 290, and thus the driving device 190, may include (e.g., in addition to switch 230 as shown in FIG. 4 and/or switches 240 and 250 shown in FIG. 5) switch 210 that is connected between the first reference voltage generator 130-1 and the second end E2 of the capacitor circuit 310, and switch 220 that is connected between the second reference voltage generator 130-2 and the third end E3 of the capacitor circuit 310.

The reference voltage generator 130 may output the maximum gamma signal VG_TOP to the gamma voltage generator 140 through the switch 210, and may output the minimum gamma signal VG_BOT to the gamma voltage generator 140 through the switch 220.

The gamma voltage generator 140 may generate the plurality of gamma voltages VG using the maximum gamma signal VG_TOP and the minimum gamma signal VG_BOT. Referring to FIG. 3, the gamma voltage generator 140 may include a plurality of resistors R0 to RN (N being any positive integer, for example being any integer equal to or greater than 1, for example being any integer equal to or greater than 2). The plurality of resistors R0 to RN may be resistor strings coupled in series. The gamma voltage generator 140 may generate a plurality of gamma voltages VG_1 to VG_N by dividing between the maximum gamma signal VG_TOP and the minimum gamma signal VG_BOT. In FIG. 3, it is illustrated that the gamma voltage generator 140 outputs voltages between the maximum gamma signal VG_TOP and the minimum gamma signal VG_BOT, divided by the plurality of resistors R0 to RN, as a plurality of gamma voltages VG, but in some example embodiments, a plurality of gamma voltages VG_1 to VG_N may further include the maximum gamma signal VG_TOP and the minimum gamma signal VG_BOT.

The switch 210 and the switch 220 may operate based on a reset signal RST. The switch 210 and the switch 220 can be opened and closed simultaneously. For example, the switch 210 and the switch 220 may be simultaneously closed in response to (e.g., based on) a first logic level of the reset signal RST, and may be simultaneously opened in response to (e.g., based on) a second logic level of the reset signal RST. In some example embodiments, the first logic level may be a high level (e.g., high magnitude signal), and the second logic level may be a low level (e.g., low magnitude signal). In some example embodiments, the first logic level may be a low level, and the second logic level may be a high level. The switch 210 and the switch 220 charge the first capacitor C1 and the second capacitor C2 of the capacitor circuit 310 by applying the maximum gamma signal VG_TOP and the minimum gamma signal VG_BOT to the capacitor circuit 310 during the first logic level of the reset signal RST, and are opened during the second logic level of the reset signal RST such that no current flows, thereby enabling the display device 10 to be driven with low power. The reset signal RST will be described later with reference to FIG. 7A to FIG. 7C.

The capacitor circuit 310 may receive a common voltage VCOM as an input and charge the capacitor based on the common voltage VCOM, the maximum gamma signal VG_TOP, and the minimum gamma signal VG_BOT.

In the display device 10, the driving voltage during the gamma voltage setting process and the driving voltage after product production may be different due to the output deviation of the DC-DC converter and the resistance deviation of the connector. Due to the deviation between the driving voltages, a difference in the light emitting characteristic of each pixel 170 of the display device 10 may occur, and thus the luminance and color coordinates corresponding to each pixel 170 may change. After production, the driving voltage may refer to the first pixel driving voltage PVDD generated by the power supply 180. In order for the display device 10 to output the gamma voltage VG according to a particular (or, in some example embodiments, predetermined) value during the process, the difference between the driving voltage and the first pixel driving voltage PVDD during the gamma voltage setting process may be compensated in real time.

Referring to FIG. 4, one end of the first capacitor C1 is connected with the gamma voltage generator 140 and thus may receive the maximum gamma signal VG_TOP, and one end of the second capacitor C2 is connected with the gamma voltage generator 140 and thus may receive the minimum gamma signal VG_BOT. The other end of the first capacitor C1 and the other end of the second capacitor C2 are connected with each other at a node ND1 and thus may receive the common voltage VCOM. For example, as shown, the capacitor circuit 310 may include a first end E1 configured to receive an input a common voltage VCOM, which as described herein may be a first driving voltage or a second driving voltage, a second end E2 configured to receive an input of the maximum gamma signal VG_TOP, and a third end E3 configured to receive an input of the minimum gamma signal VG_BOT. As shown, the reference voltage generator 130 may be configured to output the maximum gamma signal VG_TOP to a first output terminal 130T1 and output the minimum gamma signal VG_BOT to a second output terminal 130T2, and the first capacitor C1 may be connected between the first output terminal 130T1 of the reference voltage generator 130 and the first end E1 of the capacitor circuit 310 and the second capacitor C2 may be connected between the second output terminal 130T2 of the reference voltage generator 130 and the first end E1 of the capacitor circuit 310.

In order to compensate the difference between the driving voltage and the first pixel driving voltage PVDD in real time during the gamma voltage setting process, the first capacitor C1 and the second capacitor C2 of the capacitor circuit 310 perform charging (e.g., charging a charge) based on an internal driving voltage I_PVDD having the same value as the driving voltage during the gamma voltage setting process. Specifically, the common voltage VCOM may include a first pixel driving voltage PVDD or an internal driving voltage I_PVDD. The internal driving voltage I_PVDD may be referred to herein interchangeably as a first driving voltage, and the first pixel driving voltage PVDD may be referred to herein interchangeably as a second driving voltage. The first pixel driving voltage PVDD may mean an actual driving voltage. The internal driving voltage I_PVDD may mean an ideal driving voltage having the same value (e.g., same magnitude) as the driving voltage during the gamma voltage setting process. The first pixel driving voltage PVDD may be output by the power supply 180, and the internal driving voltage I_PVDD may be generated internally and output by the IC. For example, the reference voltage generator 130 may further include a driving voltage generator that generates an internal driving voltage I_PVDD. The reference voltage generator 130 may include a resistor string, and may output voltages for a maximum gamma signal VG_TOP, a minimum gamma signal VG_BOT, and an internal driving voltage I_PVDD from the resistor string.

The display device 10 may further include a switch 230. The switch 230 may selectively apply the first pixel driving voltage PVDD or the internal driving voltage I_PVDD to the node ND1 (e.g., the first end E1 of the capacitor circuit 310 in response to the reset signal RST. In some example embodiments, the switch 230 may transmit the internal driving voltage I_PVDD to the node ND1 at (e.g., in response so) the first logic level of the reset signal RST, and transmit the first pixel driving voltage PVDD to the node ND1 at the second logic level of the reset signal RST. Referring to FIG. 2, the switching circuit 290 that includes switch 230 may further include switches 210 and 220, and switches 210 and 220 may be configured to be closed in response to (e.g., at) the first logic level of the reset signal RST, and switches 210 and 220 may be configured to be opened in response to (e.g., at) the second logic level of the reset signal RST. In some example embodiments, the switch 230 may transmit the first pixel driving voltage PVDD to the node ND1 at the first logic level of the reset signal RST, and transmit the internal driving voltage I_PVDD to the node ND1 at the second logic level of the reset signal RST. For example, the switch 230 may be referred to as a first switch that is configured to transmit the internal driving voltage I_PVDD (e.g., first driving voltage) to the first end E1 of the capacitor circuit 310 based on a first logic level of the reset signal RST and transmit first pixel driving voltage PVDD (e.g., the second driving voltage) to the first end E1 of the capacitor circuit 310 based on a second logic level of the reset signal RST.

In some example embodiments, the reset signal RST for opening and closing the switch 230 and the reset signal RST for opening and closing the switch 210 and the switch 220 may be implemented differently. For example, when operating conditions of the switches 210, 220, and 230 are different from each other, the switches 210, 220, and 230 may operate using different reset signals.

The first capacitor C1 and the second capacitor C2 may be charged and discharged by using the voltage applied according to the opening and closing of the switches 210, 220, and 230. The operation of the first capacitor C1 and the second capacitor C2 will be described later with reference to FIG. 6A and FIG. 6B.

Figure 5:
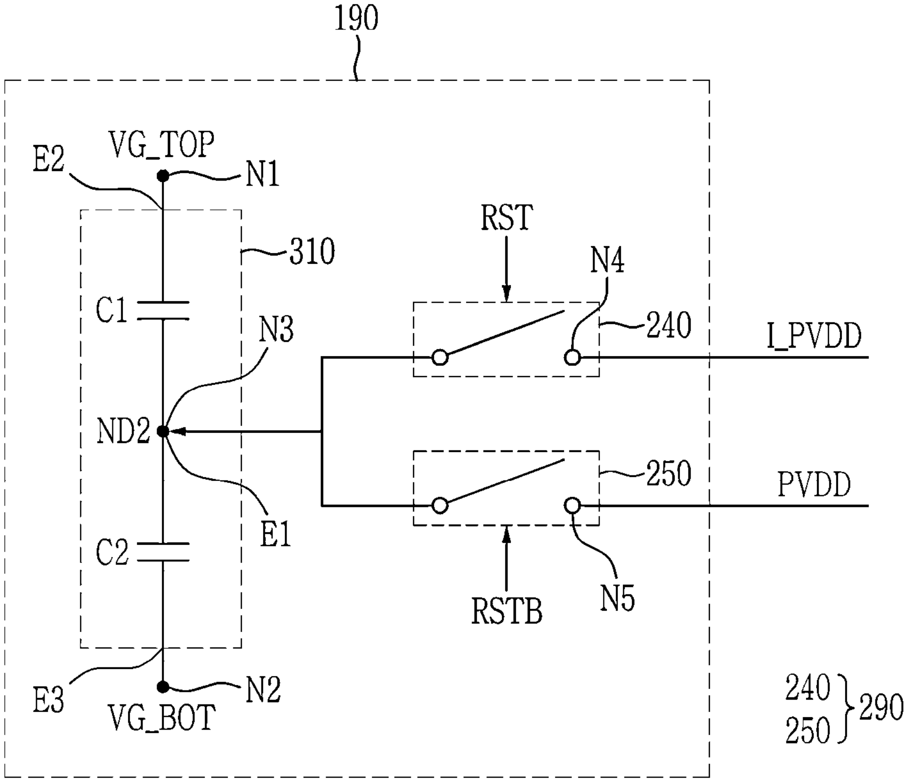
FIG. 5 is provided for description of operation of a switch according to some example embodiments.

FIG. 5 is provided for description of the operation of the switches according to some example embodiments.

FIG. 5 shows that the switch 230 of FIG. 4 is implemented as a switch 240 and a switch 250.

The switch 240 may be opened or closed based on the reset signal RST. The reset signal RST input to the switch 240 may be the same as or substantially equivalent to the reset signal RST input to the switch 230 in FIG. 4. The switch 240 is closed in response to the first logic level of the reset signal RST to apply the internal driving voltage I_PVDD to the node ND2. In addition, the switch 240 may be opened in response to the second logic level of the reset signal RST.

The switch 250 may be opened and closed based on an inverted reset signal RSTB. The inverted reset signal RSTB may be an inverted signal of the reset signal RST. The switch 250 may be closed in response to the first logic level of the inverted reset signal RSTB to apply the first pixel driving voltage PVDD to the node ND2. In addition, the switch 250 may be opened in response to the second logic level of the inverted reset signal RSTB. The switch 240 and the switch 250 may be opened and closed in reverse.

It will be understood that any switches 210, 220, 230, 240, and/or 250 or any combination thereof may comprise a switching circuit 290 of the driving device 190 and which may be understood to be configured to transmit particular signals, voltages, or the like (and/or block transmission of certain signals, voltages, or the like) to the capacitor circuit 310 based on one or more reset signals, as described herein.

Referring to FIGS. 2, 4, and 5, it will be understood that the driving device 190 may include the gamma voltage generator 140 which may be connected between a first node N1 and a second node N2, and the gamma voltage generator 140 may be configured to generate a plurality of gamma voltages VG based on a voltage of the first node N1 (e.g., maximum gamma signal VG_TOP) and a voltage of the second node N2 (e.g., minimum gamma signal VG_BOT). Referring to FIGS. 2, 4, and 5, the driving device 190 may include the first capacitor C1 which may be connected between the first node N1 and a third node N3 (which is also referred to herein as the node ND1, the first end E1 of the capacitor circuit 310, or the like), and the second capacitor C2 which may be connected between the second node N2 and the third node N3. The driving device 190 may include a first switch (which may be the switch 230 shown in FIG. 4 or, collectively, the switches 240 and 250 shown in FIG. 5) which may be connected to the third node N3 and may be configured to switch between a fourth node N4 that is configured to receive a first driving voltage (e.g., internal pixel driving voltage I_PVDD) and a fifth node N5 that is configured to receive a second driving voltage (e.g., first pixel driving voltage PVDD). Referring to FIG. 2, the driving device 190 may include switch 210 which may be a second switch that is connected between the first node N1 and a sixth node N6 that is configured to receive a maximum gamma signal VG_TOP from the reference gamma voltage generator 130. Still referring to FIG. 2, the driving device 190 may include switch 220 which may be a third switch that is connected between the second node N2 and a seventh node N7 that is configured to receive a minimum gamma signal VG_BOT from the reference gamma voltage generator 130. As shown in FIG. 5, the first switch of the driving device 190 may comprise switch 240 as a fourth switch connected between the third node N3 and the fourth node N4, and switch 250 as a fifth switch connected between the third node N3 and the fifth node N5.

Figure 6A:
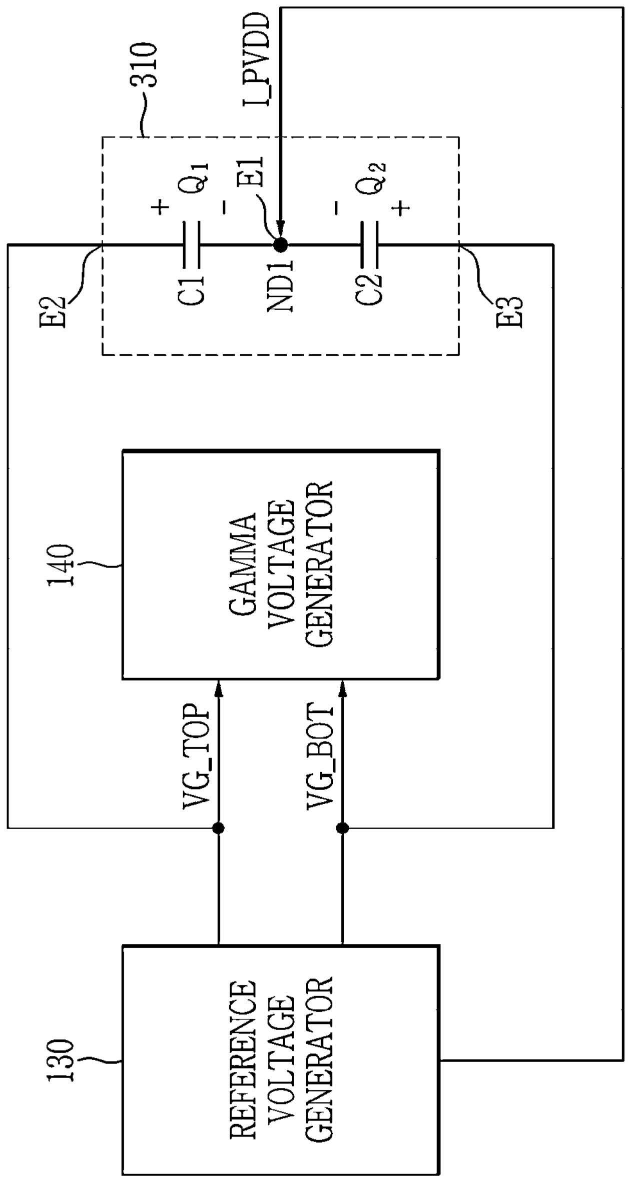
FIG. 6A is provided for description of operations of a reference voltage generator, a gamma voltage generator, and a capacitor circuit according to some example embodiments.
Figure 6B:
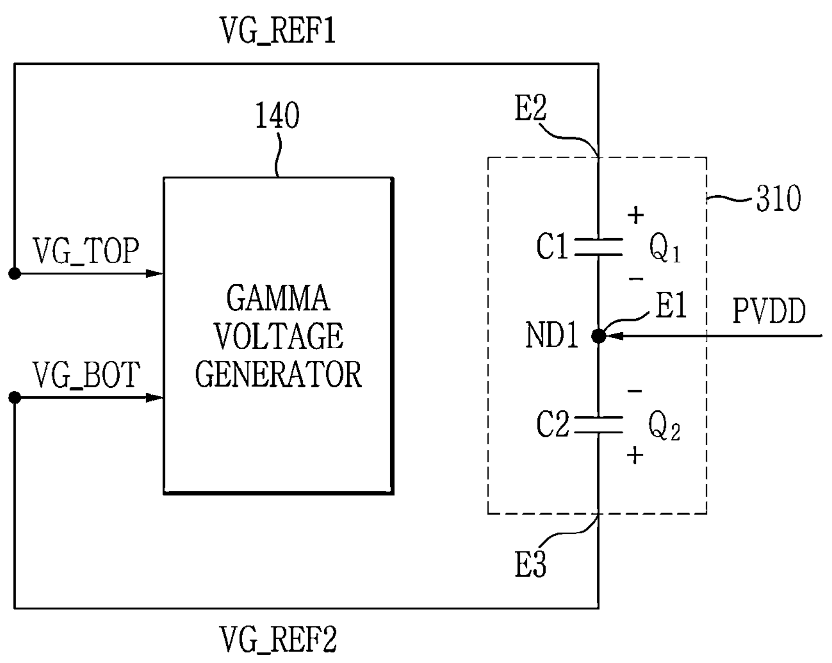
FIG. 6B is provided for description of operations of a reference voltage generator, a gamma voltage generator, and a capacitor circuit according to some example embodiments.

FIG. 6A is provided for description of the operations of the reference voltage generator, the gamma voltage generator, and the capacitor circuit according to some example embodiments, and FIG. 6B is provided for description of the operations the reference voltage generator, the gamma voltage generator, and the capacitor circuit according to some example embodiments.

Referring to FIG. 6A, the operations of the reference voltage generator 130, the gamma voltage generator 140, the first capacitor C1, and the second capacitor C2 in the case that the reset signal RST is at the first logic level can be determined. The first logic level may be a high level.

According to some example embodiments, when the reset signal RST is at the first logic level, the switch 210, the switch 220, and the switch 230 are closed. The reference voltage generator 130 and the gamma voltage generator 140 are connected through the closed switch 210 and the switch 220, and the internal driving voltage I_PVDD may be applied to the node ND1 through the closed switch 230. The reference voltage generator 130 may apply the internal driving voltage I_PVDD to the node ND1.

When the internal driving voltage I_PVDD is applied to the node ND1, the amount of charge charged in the first capacitor C1 and the second capacitor C2 may be shown as in Equation 1.

$$Q_1=(V_{GTOP}-V_{IEL})*C_1$$

$$Q_2=(V_{GBOT}-V_{IEL})*C_2 \quad \text{[Equation 1]}$$

Here, Q1 may denote the charge amount (e.g., first charge) stored in the first capacitor C1, $V_{GTOP}$ may denote a voltage value (e.g., a voltage magnitude) of the maximum gamma signal VG_TOP, $V_{IEL}$ may denote a voltage value (e.g., a voltage magnitude) of the internal driving voltage I_PVDD, and $C_1$ may denote capacitance of the first capacitor C1. $Q_2$ may denote the charge amount (e.g., second charge) of the second capacitor C2, $V_{GBOT}$ may denote a voltage value (e.g., a voltage magnitude) of the minimum gamma signal VG_BOT, and $C_2$ may denote capacitance of the second capacitor C2. Accordingly, where the internal driving voltage I_PVDD may be referred to herein as a first driving voltage, it will be understood that the capacitor circuit 310 may be configured to charge a first charge Q1 (e.g., at the first capacitor C1) based on a voltage difference between the first driving voltage (internal driving voltage I_PVDD) and the maximum gamma signal VG_TOP and to further charge a second charge Q2 (e.g., at the second capacitor C2) based on a voltage difference between the first driving voltage (internal driving voltage I_PVDD) and the minimum gamma voltage VG_BOT, in response to receiving the first driving voltage (internal driving voltage I_PVDD) at the capacitor circuit 310 via the first end E1.

The gamma voltage generator 140 may generate a plurality of gamma voltages VG based on the maximum gamma signal VG_TOP and the minimum gamma signal VG_BOT, and output the plurality of gamma voltages VG to the data driver 150. The data driver 150 may generate a data signal based on the plurality of gamma voltages VG and output the data signal to the display panel 160.

The first capacitor C1 and the second capacitor C2 perform charging (e.g., charging the first and second charges Q1 and Q2, respectively), and the reset signal RST may perform transition from the first logic level to the second logic level.

Referring to FIG. 6B, the operations of the gamma voltage generator 140, the first capacitor C1, and the second capacitor C2 in the case that the reset signal RST is at the second logic level can be determined. The second logic level may be a low level. At the second logic level of the reset signal RST, the switch 210 and the switch 220 are opened, and therefore the reference voltage generator 130 does not affect the operation of the gamma voltage generator 140. The reference voltage generator 130 may be powered off or operated in a low power mode. Accordingly, since noise and power of the reference voltage generator 130 become 0 during image display, the display device 10 can reduce noise and operate with low power.

In some example embodiments, the switch 230 may apply the first pixel driving voltage PVDD (e.g., the second driving voltage) to the node ND1 in response to the second logic level of the reset signal RST. The power supply 180 may apply the first pixel driving voltage PVDD to the node ND1 (e.g., via the first end E1). Accordingly, the first capacitor C1 and the second capacitor C2 may be coupled to the first pixel driving voltage PVDD while maintaining a charge amount Q1 and a charge amount Q2, respectively. When noise is generated in the first pixel driving voltage PVDD, the first capacitor C1 and the second capacitor C2 change the maximum gamma signal VG_TOP and the minimum gamma signal VG_BOT such that the gamma voltage generator 140 stably generates the gamma voltage VG. For example, as shown, the capacitor circuit 310 may output (e.g., from the first capacitor C1) a first gamma reference voltage VG_REF1 to the second end E2 and output (e.g., from the second capacitor C2) a second gamma reference voltage VG_REF2 to the third end E3, in response to receiving the second driving voltage (e.g., the first pixel driving voltage PVDD) via the first end E1. As shown, the gamma voltage generator 140 may receive the second gamma reference voltage VG_REF2 as the minimum gamma signal VG_BOT (e.g., via the input terminal configured to receive the minimum gamma signal VG_BOT). The gamma voltage generator 140 generates a plurality of gamma voltages VG using the maximum gamma signal VG_TOP and the minimum gamma signal VG_BOT, which the first capacitor C1 and the second capacitor C2 apply based on the first pixel driving voltage PVDD, and may output the plurality of gamma voltages VG to the data driver 150. Restated, the gamma voltage generator 140 may generate a plurality of gamma voltages VG based on the first gamma reference voltage VG_REF1 and the second gamma reference voltage VG_REF2 which the first capacitor C1 and the second capacitor C2 apply based on the first pixel driving voltage PVDD (e.g., the second driving signal), and may output the plurality of gamma voltages VG to the data driver 150. The data driver 150 may generate a data signal based on the plurality of gamma voltages VG and output the data signal to the display panel 160. As a result, the display device 10 may output stable high-quality images.

Selectively, the switch 230 may be connected to the ground. For example, when the display device 10 operates abnormally and when the reset signal RST is not applied to the switch 230, the switch 230 may be connected to the ground.

In some example embodiments, the reset signal RST applied to the switch 210 and the switch 220 and the reset signal RST applied to the switch 230 may be the same. That is, the first capacitor C1 is charged by the amount of charge Q1 based on the maximum gamma signal VG_TOP and the internal driving voltage I_PVDD at the first logic level of the reset signal RST, and the second capacitor C2 is charged by the amount of charge Q2 based on the minimum gamma signal VG_BOT and the internal driving voltage I_PVDD.

In some example embodiments, a time difference may exist between the reset signal RST applied to the switch 210 and the switch 220 and the reset signal RST applied to the switch 230. For example, the reset signal RST applied to the switch 230 may be faster than the reset signal RST applied to the switch 210 and the switch 220. That is, after the switch 230 is closed to apply the internal driving voltage I_PVDD, the switch 210 and the switch 220 may be closed to transmit the maximum gamma signal VG_TOP and the minimum gamma signal VG_BOT. For example, the reset signal RST may be input to the switch 210 and the switch 220 after passing through a buffer. In some example embodiments, the switch 210 and the switch 220 may be opened and closed with a particular (or, in some example embodiments, predetermined) time delay after receiving the reset signal RST.

Figure 7A:
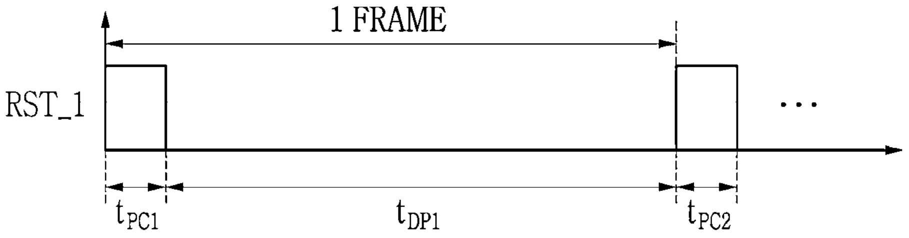
FIG. 7A is a timing diagram provided for description of a reset signal according to some example embodiments.

FIG. 7A is a timing diagram provided for description of a reset signal according to some example embodiments.

Referring to FIG. 7A, the reset signal RST described with reference to FIG. 2, FIG. 4, and FIG. 5 may be implemented as a reset signal RST_1. The reset signal RST_1 may have the same period as the vertical synchronization signal VSYNC. That is, a period of the reset signal RST_1 may be 1 frame period. The reset signal RST_1 may have the same period and division ratio as the vertical synchronization signal VSYNC.

One period of the reset signal RST_1 may include a porch region $t_{PC1}$ and a display region $t_{DP1}$. The porch region $t_{PC1}$ may be referred to interchangeably as a first region, first period, etc. of the reset signal RST_1 and the display region $t_{DP1}$ may be referred to interchangeably as a second region, second period, etc. of the reset signal RST_1. One period of the reset signal RST_1 may be one frame. The porch region $t_{PC1}$ may mean a blank region in which the display panel 160 does not display an image before displaying an image of one frame and/or after displaying an image of one frame. In some example embodiments, the porch region $t_{PC1}$ may be a region of the reset signal RST_1 having a first logic level (e.g., high or low level) and the display region $t_{DP1}$ may be a region of the reset signal RST_1 having a different, second logic level (e.g., low or high level). The switching circuit 290 may control one or more switches 210, 220, 230, 240, and/or 250 based on the different logic levels of the reset signal RST_1 of the different regions thereof.

The first capacitor C1 and the second capacitor C2 may charge a charge (e.g., generate a charge, accumulate a charge, build a charge, etc.) in response to the high level of the reset signal RST_1 in the porch region $t_{PC1}$. For example, in the porch region $t_{PC1}$, the first capacitor C1 is charged by a charge amount Q1 based on the maximum gamma signal VG_TOP and the internal driving voltage I_PVDD, and the second capacitor C2 is charged by a charge amount of Q2 based on the minimum gamma signal VG_BOT and the internal driving voltage I_PVDD. For example, the switching circuit 290 may be configured to, based on operation of one or more switches 230, 240, 250, 210, and/or 220, transmit the internal driving voltage I_PVDD (first driving voltage), the maximum gamma signal VG_TOP, and the minimum gamma signal VG_BOT to the capacitor circuit in (e.g., based on, in response to, during, etc.) the porch region $t_{PC1}$ (e.g., first region) of the reset signal RST_1.

The reference voltage generator 130 and the gamma voltage generator 140 may be disconnected in response to the low level of the reset signal RST_1 in the display region $t_{DP1}$. For example, the switching circuit 290 may be configured to, based on operation of one or more switches 230, 240, 250, 210, and/or 220, block transmission of the maximum gamma signal VG_TOP and the minimum gamma signal VG_BOT from the reference voltage generator 130 to the capacitor circuit 310 in (e.g., based on, in response to, during, etc.) the display region $t_{DP1}$ (e.g., second region) of the reset signal RST_1. The reference voltage generator 130 may be powered off or operated in a low power mode. Accordingly, the display device 10 may operate with low power.

The first capacitor C1 and the second capacitor C2 may be coupled to the first pixel driving voltage PVDD in response to the low level of the reset signal RST_1 in the display region $t_{DP1}$. For example, the switching circuit 290 may be configured to, based on operation of one or more switches 230, 240, 250, 210, and/or 220, transmit the first pixel driving voltage PVDD (second driving voltage) to the capacitor circuit in (e.g., based on, in response to, during, etc.) the display region $t_{DP1}$ (e.g., second region) of the reset signal RST_1. Accordingly, the gamma voltage generator 140 may generate a stable plurality of gamma voltages VG by using a maximum gamma signal VG_TOP and a minimum gamma signal VG_BOT coupled to the first pixel driving voltage PVDD.

After the display panel 160 displays the image of one frame, the porch region $t_{PC2}$ of the next frame may start. In the porch region $t_{PC2}$, switch opening and closing, charge charging, and the like may be performed in the same way as in the porch region $t_{PC1}$.

Figure 7B:
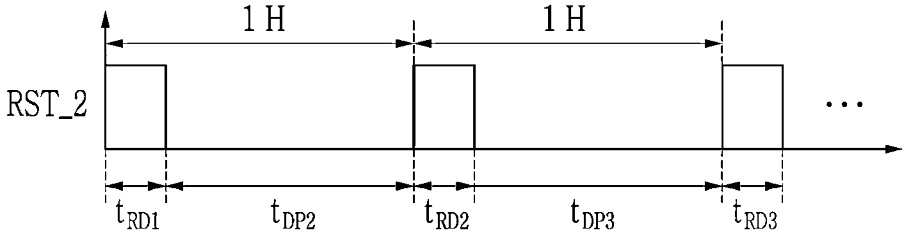
FIG. 7B is a timing diagram provided for description of a reset signal according to some example embodiments.

FIG. 7B is a timing diagram for description of a reset signal according to some example embodiments.

Referring to FIG. 7B, the reset signal RST described with reference to FIG. 2, FIG. 4, and FIG. 5 may be implemented as a reset signal RST_2. The reset signal RST_2 may have the same period and division ratio as a horizontal synchronization signal HSYNC. That is, a period of the reset signal RST_2 may be 1 horizontal period 1H. The reset signal RST_2 may include a plurality of horizontal periods in one frame. The display device 10 may perform switch opening/closing, charge charging, coupling, and the like whenever a scan-on voltage is applied to each scan line by using the reset signal RST_2.

One period of the reset signal RST_2 may include a ready region $t_{RD1}$ and a display period $t_{DP2}$. The ready period $t_{RD1}$ may indicate a start period in which a scan-on voltage is applied in one scan line of a display panel 160.

The first capacitor C1 and the second capacitor C2 may charge a charge in response to a high level (e.g., a first logic level) of the reset signal RST_2 in the ready region $t_{RD1}$. For example, in the ready region $t_{RD1}$, the first capacitor C1 may be charged by the charge amount Q1 based on the maximum gamma signal VG_TOP and the internal driving voltage I_PVDD, and the second capacitor C2 may be charged by the charge amount Q2 based on the minimum gamma signal VG_BOT and the internal driving voltage I_PVDD.

The reference voltage generator 130 and the gamma voltage generator 140 may be disconnected in response to the low level (e.g., a second logic level) of the reset signal RST_2 in the display period $t_{DP2}$. The reference voltage generator 130 may be powered off or operated in a low power mode. Accordingly, the display device 10 may operate with low power.

The first capacitor C1 and the second capacitor C2 may be coupled to the first pixel driving voltage PVDD in response to the low level of the reset signal RST_2 in the display period $t_{DP2}$. Accordingly, the gamma voltage generator 140 may generate a stable plurality of gamma voltages VG by using the maximum gamma signal VG_TOP and the minimum gamma signal VG_BOT coupled to a first pixel driving voltage PVDD.

After scan of one line is performed on the display panel 160, a ready region $t_{RD2}$ of the next line is started, and switch opening and closing, charge charging, and the like may be performed in the same manner as in the ready region $t_{RD1}$. In addition, switch opening and closing, coupling, and the like may be performed in a display period $t_{DP3}$ as in the display period $t_{DP2}$.

In this way, even after the ready region $t_{RD3}$, the same operation can be performed whenever the scan-on voltage is applied to each scan line of the display panel 160 by performing the above-described operations.

Figure 7C:
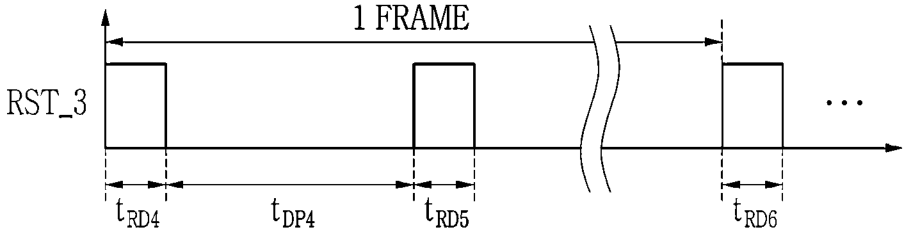
FIG. 7C is a timing diagram provided for description of a reset signal according to some example embodiments.

FIG. 7C is a timing diagram provided for description of a reset signal according to some example embodiments.

Referring to FIG. 7C, the reset signal RST described with reference to FIG. 2, FIG. 4, and FIG. 5 may be implemented as a reset signal RST_3. A period and a division ratio of the reset signal RST_3 may be particular (or, in some example embodiments, predetermined) or may be variably changed according to circumstances. For example, the period of the reset signal RST_3 may be set to a ½ frame, a ⅓ frame, a ¼ frame, a ½ horizontal period, or a ¼ horizontal period. That is, in FIG. 7C, lengths of a ready region $t_{RD4}$, a display period $t_{DP4}$, a ready region $t_{RD5}$, and a ready region $t_{RD6}$ may be changeable.

One frame may include at least the ready region $t_{RD4}$, the display period $t_{DP4}$, the ready region $t_{RD5}$, and the ready region $t_{RD6}$. The ready region $t_{RD4}$ and the ready region $t_{RD5}$ may be regions for charging charges to a capacitor circuit 310. The ready region $t_{RD4}$ may mean a blank region in which a display panel 160 does not display an image before displaying an image of one frame and/or after displaying an image of one frame. A starting point of the ready region $t_{RD5}$ may be different depending on a period of the reset signal RST_3. For example, when the period of the reset signal RST_3 is ½ frame, the starting point of the ready region $t_{RD5}$ may be a middle point of the frame. When the period of the reset signal RST_3 is ⅓ frame, the starting point of the ready region $t_{RD5}$ may be a ⅓ point of the frame.

A first capacitor C1 and a second capacitor C2 may charge a charge in response to a high level of the reset signal RST_3 in the ready region $t_{RD4}$. For example, in the ready region $t_{RD4}$, the first capacitor C1 is charged by a charge amount of Q1 based on a maximum gamma signal VG_TOP and an internal driving voltage I_PVDD, and the second capacitor C2 is charged by a charge amount to Q2 based on a minimum gamma signal VG_BOT and the internal driving voltage I_PVDD.

The reference voltage generator 130 and the gamma voltage generator 140 may be disconnected in response to a low level of the reset signal RST_3 in the display period $t_{DP4}$. The reference voltage generator 130 may be powered off or operated in a low power mode. Accordingly, the display device 10 may operate with low power.

The first capacitor C1 and the second capacitor C2 may be coupled to a first pixel driving voltage PVDD in response to the low level of the reset signal RST_3 in the display period $t_{DP4}$. Accordingly, the gamma voltage generator 140 may generate a stable plurality of gamma voltages VG by using the maximum gamma signal VG_TOP and the minimum gamma signal VG_BOT coupled to the first pixel driving voltage PVDD.

In the ready region $t_{RD5}$, a switch 210, a switch 220, and a switch 230 according to some example embodiments may operate in the same manner as in the ready region $t_{RD4}$. Accordingly, the reference voltage generator 130, the gamma voltage generator 140, the first capacitor C1, and the second capacitor C2 may operate in the ready region $t_{RD5}$ in the same manner as in the ready region $t_{RD4}$.

In a display period following the ready region $t_{RD5}$, the switch 210, the switch 220, and the switch 230 according to some example embodiments may operate the same as in the display period $T_{DP4}$. Accordingly, the reference voltage generator 130, the gamma voltage generator 140, the first capacitor C1, and the second capacitor C2 may operate in the same display period after the ready region $t_{RD5}$ as in the display period $T_{DP4}$.

After the image of one frame is output, a ready region $t_{RD6}$ of the next frame may start. In the ready region $t_{RD6}$, switch opening and closing, charge charging, and the like may be performed in the same manner as in the ready region $t_{RD4}$ and the ready region $t_{RD5}$.

In FIG. 7C, although it is illustrated that a step signal is applied as the reset signal RST_3 in the ready regions $t_{RD4}$, $t_{RD5}$, and $t_{RD6}$, the present inventive concepts is not limited thereto. Each of the ready regions $t_{RD4}$, $t_{RD5}$, and $t_{RD6}$ may be implemented to include a plurality of unit signals. For example, where the ready regions $t_{RD4}$, $t_{RD5}$, and $t_{RD6}$ are referred to as regions having a first logic level of the reset signal RST_3, said regions may each include a plurality of unit signals having the first logic level. For example, the unit signal may be a step signal, an impulse signal, and the like. In this case, the switches 210, 220, and 230 may be configured to open and close when a signal of particular (or, in some example embodiments, predetermined) intensity is input for a particular (or, in some example embodiments, predetermined) time or when a signal of a particular (or, in some example embodiments, predetermined) number of times is input for a particular (or, in some example embodiments, predetermined) time.

In some example embodiments, determining the period and division ratio of the reset signal RST_3 may be performed by an artificial intelligence model. The artificial intelligence model may learn to determine the period and division ratio of the reset signal RST_3 based on learning data about (e.g., data associated with) the characteristic of the input video signal DATA and the characteristic of the display device 10. Such an artificial intelligence model may be operated using dedicated hardware (e.g., a neural processing unit (NPU)) depending on implementation.

Figure 8:
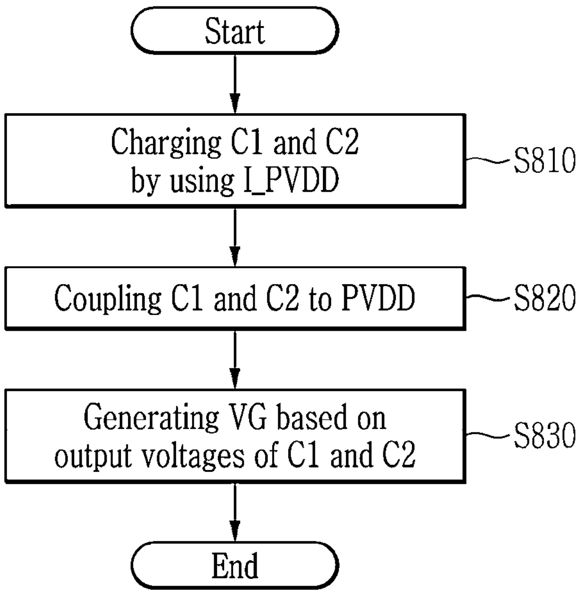
FIG. 8 is a flowchart for description of a driving method of a display panel according to some example embodiments.

FIG. 8 is a flowchart for description of a driving method of the display panel according to some example embodiments.

Referring to FIG. 8, the display device 10 may charge the first capacitor C1 and the second capacitor C2 using the internal driving voltage I_PVDD (e.g., the first driving voltage) (S810). The first capacitor C1 and the second capacitor C2 are coupled in series to form one capacitor circuit 310, and may be disposed in parallel with the reference voltage generator 130 and the gamma voltage generator 140. One end of the first capacitor C1 and one end of the second capacitor C2 are connected to each other, and the first pixel driving voltage PVDD or the internal driving voltage I_PVDD may be input based on the reset signal RST. At least one of a period or a division ratio of the reset signal RST may be the same as that of the vertical synchronization signal VSYNC or the horizontal synchronization signal HSYNC.

The first capacitor C1 may be charged by the charge amount Q1 based on both the maximum gamma signal VG_TOP and the internal driving voltage I_PVDD, and the second capacitor C2 may be charged by the charge amount Q2 based on both the minimum gamma signal VG_BOT and the internal driving voltage I_PVDD.

The first capacitor C1 and the second capacitor C2 may be charged based on the reset signal RST. For example, the first capacitor C1 and the second capacitor C2 may be connected to a plurality of switches 210 to 230 that are opened and closed based on the reset signal RST.

In some example embodiments, the switch 210 is closed at the first logic level of the reset signal RST to output the maximum gamma signal VG_TOP to the first capacitor C1, and the switch 220 is closed at the first logic level of the reset signal RST to output the minimum gamma signal VG_BOT to the second capacitor C2. In addition, the switch 230 may be closed at the first logic level of the reset signal RST to output the internal driving voltage I_PVDD to the first capacitor C1 and the second capacitor C2.

In some example embodiments, the switch 210 and the switch 220 may be opened at the first logic level of the reset signal RST and closed at the second logic level. The switch 230 may apply the internal driving voltage I_PVDD to the node ND1 at the second logic level of the reset signal RST.

The display device 10 may couple the first pixel driving voltage PVDD (e.g., a second driving voltage) to the first capacitor C1 and the second capacitor C2 (S820).

In some example embodiments, the switch 230 may output the first pixel driving voltage PVDD to the first capacitor C1 and the second capacitor C2 at the second logic level of the reset signal RST. That is, when the reset signal RST performs transition from the first logic level to the second logic level (e.g., in response to the transition), the switch 230 may switch the internal driving voltage I_PVDD to the first pixel driving voltage PVDD and apply it (e.g., the first pixel driving voltage PVDD) to the first capacitor C1 and the second capacitor C2. In addition, the switch 210 and the switch 220 may be opened at the second logic level of the reset signal RST to separate the reference voltage generator 130 and the gamma voltage generator 140.

In some example embodiments, the switch 230 may apply the first pixel driving voltage PVDD to the node ND1 at the first logic level of the reset signal RST. In addition, the switch 210 and the switch 220 may be opened at the first logic level of the reset signal RST.

As the first capacitor C1 and the second capacitor C2 are coupled to the first pixel driving voltage PVDD while being charged by the charge amounts Q1 and Q2, respectively, the display device 10 stably generates a gamma voltage VG despite the noise of the first pixel driving voltage PVDD, since each of the first capacitor C1 and the second capacitor C2 operates with a constant amount of charges Q1 and Q2, the change in the first pixel driving voltage PVDD caused by noise may be equally applied to the maximum gamma signal VG_TOP and the minimum gamma signal VG_BOT. Accordingly, the display device 10 may uniformly output a plurality of gamma voltages VG, thereby enabling stable image output with high quality and thus improving the performance (e.g., image display performance) of the display device 10 to display high-quality images via the pixels 170 of the display panel 160.

The display device 10 may generate the gamma voltage VG based on the output voltage of the first capacitor C1 and the output voltage of the second capacitor C2 (S830). The gamma voltage generator 140 may generate the gamma voltage VG by dividing between the output voltage of the first capacitor C1 (e.g., the first reference gamma voltage VG_REF1) and the output voltage of the second capacitor C2 (e.g., the second reference gamma voltage VG_REF2), and output the gamma voltage VG to the data driver 150.

Figure 9:
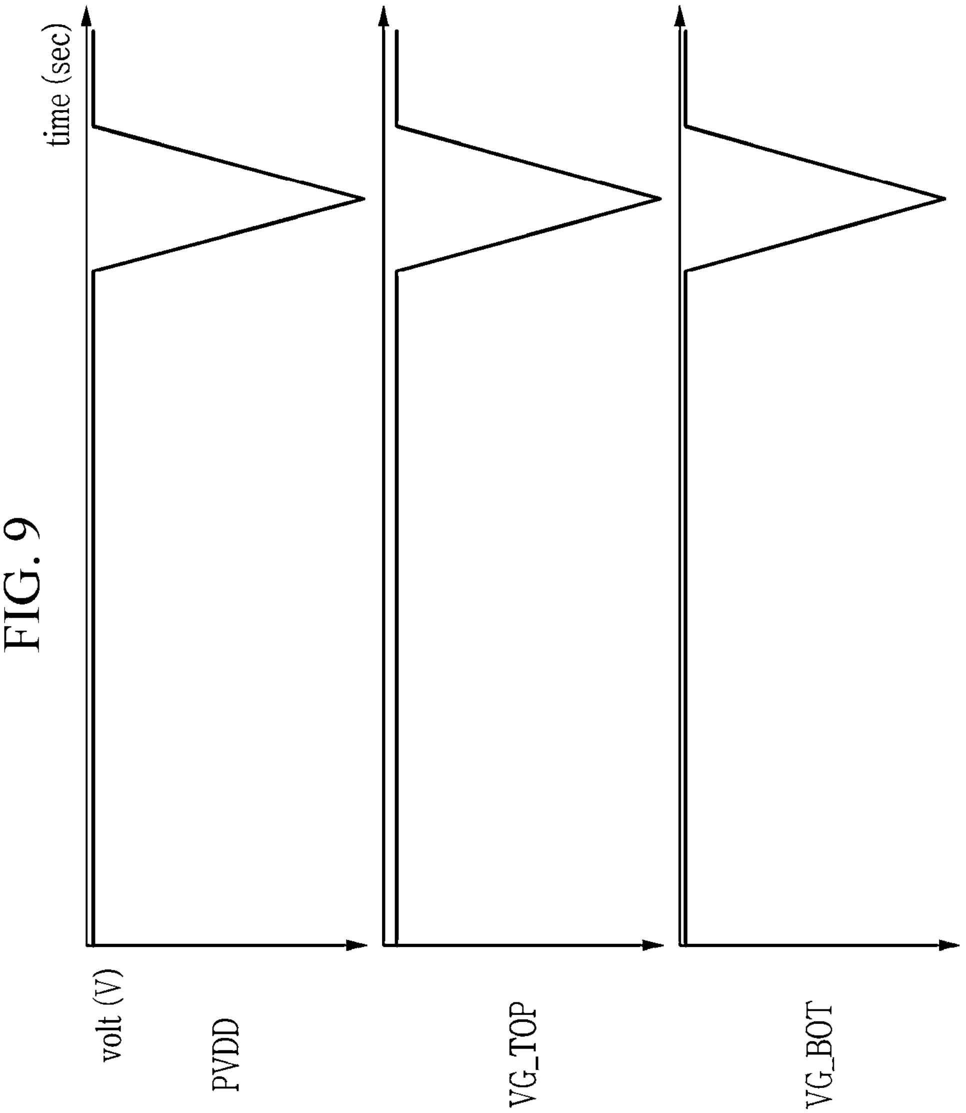
FIG. 9 is a graph for describing an advantageous effect of a driving device for a display panel according to some example embodiments.
Figure 10:
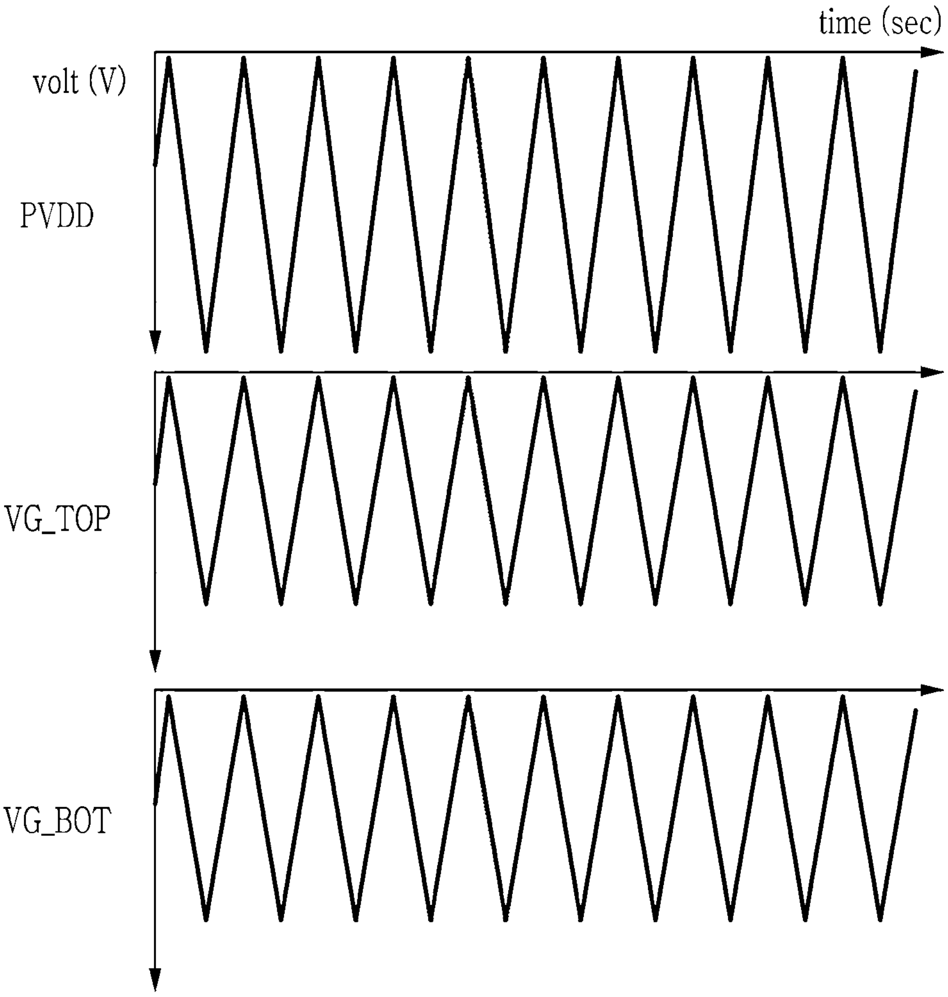
FIG. 10 is a graph for describing an advantageous effect of a driving device for a display panel according to some example embodiments.

FIG. 9 is a graph for description of an advantageous effect of the driving device of the display panel according to some example embodiments, and FIG. 10 is a graph for description of an advantageous effect of the driving device of the display panel according to some example embodiments.

Referring to FIG. 9, changes in the maximum gamma signal VG_TOP and the minimum gamma signal VG_BOT of the display device 10 when one pulse noise is generated in the first pixel driving voltage PVDD in the display device 10 according to some example embodiments can be determined.

Referring to FIG. 10, changes in the maximum gamma signal VG_TOP and the minimum gamma signal VG_BOT of the display device 10 when noise such as a ripple is generated in the first pixel driving voltage PVDD can be determined.

Since the existing display device is affected by the bandwidth in terms of circuit characteristics, when the bandwidth is insufficient, the offset other than the change in the first pixel driving voltage PVDD caused by noise is also applied to the maximum gamma signal VG_TOP and the minimum gamma signal VG_BOT, thereby causing a problem of deterioration in the quality of the image. To solve such a problem, current consumption to secure bandwidth is increased or a circuit is added to compensate for noise in the existing display device. The addition of a noise compensation circuit may cause an increase in the size of the driving circuit.

However, in the display device 10 according to some example embodiments, since each of the first capacitor C1 and the second capacitor C2 operates with a constant amount of charges Q1 and Q2, the change in the first pixel driving voltage PVDD caused by noise may be equally applied to the maximum gamma signal VG_TOP and the minimum gamma signal VG_BOT. Accordingly, the display device 10 may uniformly output a plurality of gamma voltages VG, thereby enabling stable image output with high quality and thus improving the performance (e.g., image display performance) of the display device 10 to display high-quality images via the pixels 170 of the display panel 160.

In addition, in the display device 10 according to some example embodiments, since the switch 210 and the switch 220 are opened according to the reset signal RST to turn off the power of the reference voltage generator 130 or operate the reference voltage generator 130 in a low power mode, it is less affected by the bandwidth, and thus the waveform of the maximum gamma signal VG_TOP and the minimum gamma signal VG_BOT according to the noise of the first pixel driving voltage PVDD is not distorted, and the offset may not occur.

Figure 11:
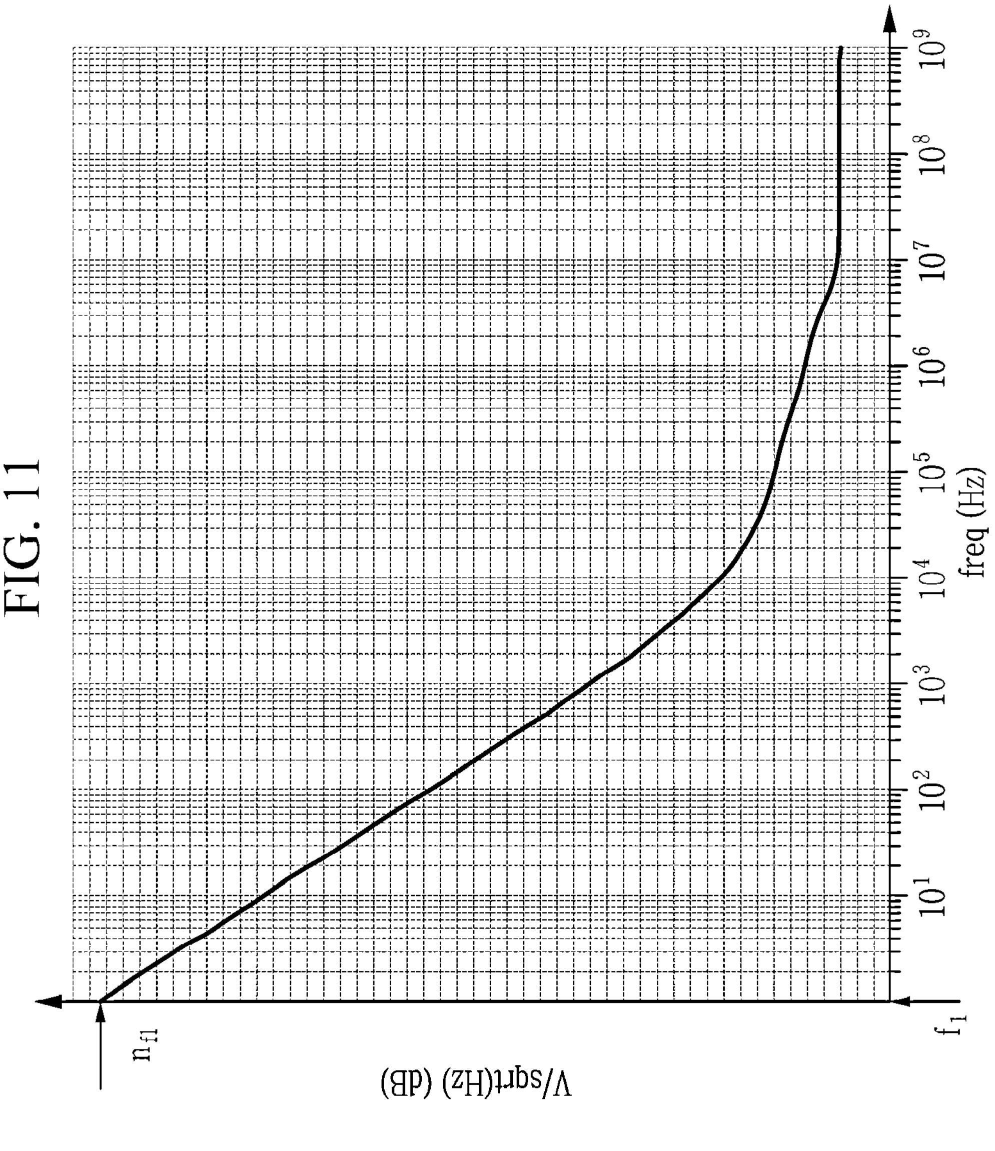
FIG. 11 is a graph for describing an advantageous effect of a driving device for a display panel according to some example embodiments.

FIG. 11 is a graph for description of an advantageous effect of the driving device of the display panel according to some example embodiments.

Referring to FIG. 11, a noise according to a frequency of the display device 10 according to some example embodiments can be determined.

In the display device 10 according to some example embodiments, the capacitor circuit 310 is charged according to the reset signal RST, and the switch 210 and the switch 220 may be opened such that the power of the reference voltage generator 130 can be turned off or the reference voltage generator 130 can be operated in a low power mode. That is, since the reference voltage generator 130 including an amplifier is disconnected after the capacitor circuit 310 is charged, the current consumption is reduced such that it can be operated with low power, and a noise such as a flicker noise may be reduced in a low frequency section (e.g., 1 Hz or less) having a low frame rate.

The display device 10 according to some example embodiments may have a noise nf1 at a frequency f1, and the noise nf1 has a much more reduced value than the noise of the existing display device. The frequency f1 may be 1 Hz.

In addition, in the display device 10 according to some example embodiments, the noise can be greatly reduced as the frequency is higher than the frequency f1. In the existing display device, a noise reduction width is smaller than that of the display device 10 according to some example embodiments even though the frequency increases. That is, the noise graph according to the frequency of the existing display device is drawn above the graph of the display device 10 according to some example embodiments in FIG. 11.

The advantageous effects described with reference to FIG. 9 to FIG. 11 may be equally applied to the driving method of the display panel of some example embodiments described with reference to FIG. 8.

Figure 12:
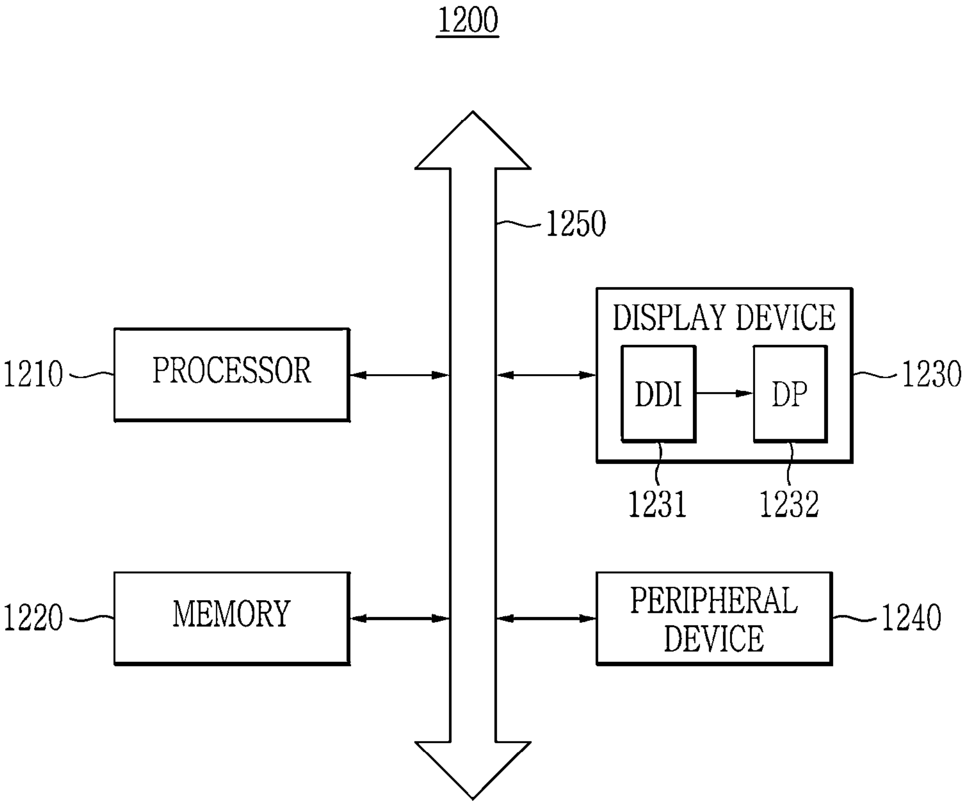
FIG. 12 is a diagram for describing a semiconductor system according to some example embodiments.

FIG. 12 is provided to describe a semiconductor system according to some example embodiments.

Referring to FIG. 12, a semiconductor system 1200 according to some example embodiments may include a processor 1210 electrically connected to a system bus 1250, a memory 1220, a display device 1230, and a peripheral device 1240.

The processor 1210 may control input and output of data of the memory 1220, the display device 1230, and the peripheral device 1240, and may perform image processing of image data transmitted between the corresponding devices.

The display device 1230 includes a display driver IC (DDI) 1231 and a display panel (DP) 1232, and stores image data applied through the system bus 1250 in a frame memory included in the DDI 1231 and displays on the DP 1232. The display device 10 described with reference to FIG. 1 to FIG. 11 may be integrated to the display device 1230.

The peripheral device 1240 may be a device that converts a motion picture or still image, such as a camera, a scanner, or a webcam, into an electrical signal. The image data acquired through the peripheral device 1240 may be stored in the memory 1220, or may be displayed on the DP 1232 in real time.

The memory 1220 may include volatile memory such as dynamic random access memory (DRAM) and/or non-volatile memory such as flash memory. The memory 1220 may be configured as a DRAM, a phase-change random access memory (PRAM), a magnetic random access memory (MRAM), a resistive random access memory (Re-RAM), a ferroelectric random access memory (FRAM), a NOR flash memory, a NAND flash memory, and a fusion flash memory (e.g., a static random access memory (SRAM) buffer, a memory in which NAND flash memory and NOR interface logic are combined), and the like. The memory 1220 may store image data acquired from the peripheral device 1240 or a video signal processed by the processor 1210.

The semiconductor system 1200 may be provided in mobile electronic products such as smartphones, but is not limited thereto, and may be provided in various types of electronic products that display images.

In some example embodiments, each constituent element or a combination of two or more constituent elements described with reference to FIG. 1 to FIG. 12 may be implemented as a digital circuit, a programmable or non-programmable logic device or array, an application specific integrated circuit (ASIC), and the like.

As described herein, any devices, electronic devices, modules, units, and/or portions thereof according to any of the example embodiments, and/or any portions thereof (including, without limitation, the display device 10, the timing controller 110, the scan driver 120, the reference voltage generator 130, the gamma voltage generator 140, the data driver 150, the display panel 160, the pixels 170, the power supply 180, the capacitor circuit 310, the switch 210, the switch 220, the processor 1210, the memory 1220, the display device 1230, the DDI 1231, the DP 1232, the peripheral device 1240, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, electronic devices, modules, units, and/or portions thereof according to any of the example embodiments.

Any of the memories described herein, including, without limitation, the memory 1220, may be a non-transitory computer readable medium and may store a program of instructions. Any of the memories described herein may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

Some example embodiments of the present inventive concepts have been described in detail above, but the scope of the present inventive concepts is not limited thereto, and various modifications and improvements performed by a person of ordinary skill in the art using the basic concept of the present inventive concepts defined in the following claims range also belong to the scope of the present inventive concepts.

What is claimed is:

1. A driving device of a display panel, the driving device comprising:

a reference voltage generator configured to generate a maximum gamma voltage and a minimum gamma voltage;

a capacitor circuit, the capacitor circuit including a first end configured to receive an input of a first driving voltage or a second driving voltage, a second end configured to receive an input of the maximum gamma voltage, and a third end configured to receive an input of the minimum gamma voltage, wherein the capacitor circuit is configured to charge a first charge based on a voltage difference between the first driving voltage and the maximum gamma voltage and charge a second charge based on a voltage difference between the first driving voltage and the minimum gamma voltage, in response to receiving the first driving voltage via the first end, and output a first gamma reference voltage and a second gamma reference voltage to the second end and the third end, respectively, in response to receiving the second driving voltage via the first end; and a gamma voltage generator that is configured to generate a plurality of gamma voltages based on the first gamma reference voltage and the second gamma reference voltage, wherein the first driving voltage is generated by a power supply, and the second driving voltage is generated by an integrated circuit (IC) that is separate from the power supply.

2. The driving device of claim 1, wherein:

the reference voltage generator is configured to output the maximum gamma voltage to a first output terminal, and output the minimum gamma voltage to a second output terminal, and the capacitor circuit comprises:

a first capacitor that is connected between the first output terminal of the reference voltage generator and the first end of the capacitor circuit; and a second capacitor that is connected between the second output terminal of the reference voltage generator and the first end of the capacitor circuit.

3. The driving device of claim 1, wherein:

the reference voltage generator and the gamma voltage generator are on the integrated circuit (IC), and the capacitor circuit is outside the IC.

4. The driving device of claim 1, further comprising a switching circuit that is configured to transmit the first driving voltage, the maximum gamma voltage, and the minimum gamma voltage to the capacitor circuit in a first region of a reset signal, transmit the second driving voltage to the capacitor circuit in a second region of the reset signal, and block transmission of the maximum gamma voltage and the minimum gamma voltage to the capacitor circuit in the second region of the reset signal.

5. The driving device of claim 1, further comprising a first switch that is configured to transmit the first driving voltage to the first end of the capacitor circuit based on a first logic level of a reset signal, and transmit the second driving voltage to the first end of the capacitor circuit based on a second logic level of the reset signal.

6. The driving device of claim 5, wherein:

the reset signal comprises a region having the first logic level and a region having the second logic level in one period.

7. The driving device of claim 6, wherein:

a period and a division ratio of the reset signal are the same as a period and a division ratio, respectively, of a vertical synchronization signal.

8. The driving device of claim 6, wherein:

a period and a division ratio of the reset signal are the same as a period and a division ratio, respectively, of a horizontal synchronization signal.

9. The driving device of claim 6, wherein:

the region having the first logic level includes a plurality of unit signals having the first logic level.

10. The driving device of claim 5, wherein:

the reference voltage generator comprises a first reference voltage generator that is configured to generate the maximum gamma voltage and a second reference voltage generator that is configured to generate the minimum gamma voltage, and the driving device further includes a second switch that is connected between the first reference voltage generator and the second end of the capacitor circuit, and a third switch that is connected between the second reference voltage generator and the third end of the capacitor circuit.

11. The driving device of claim 10, wherein:

The second switch and the third switch are configured to be closed in response to the first logic level of the reset signal, and the second switch and the third switch are configured to be opened in response to the second logic level of the reset signal.

12. The driving device of claim 1, further comprising:

a first switch that is configured to output the first driving voltage to the first end of the capacitor circuit based on a reset signal; and a second switch that is configured to output the second driving voltage to the first end of the capacitor circuit based on an inverted signal of the reset signal.

13. A driving method of a display panel, the driving method comprising:

charging a first charge in a first capacitor and charging a second charge in a second capacitor using a first driving voltage;

coupling a second driving voltage to each of the first capacitor and the second capacitor; and generating a gamma voltage based on an output voltage of the first capacitor and an output voltage of the second capacitor, wherein the first driving voltage is generated by a power supply, and the second driving voltage is generated by an integrated circuit (IC) that is separate from the power supply.

14. The driving method of claim 13, wherein:

the charging comprises:

charging the first charge to the first capacitor using both the first driving voltage and a maximum gamma voltage; and charging the second charge to the second capacitor using both the first driving voltage and a minimum gamma voltage.

15. The driving method of claim 13, wherein:

the charging comprises charging the first charge to the first capacitor and charging the second charge to the second capacitor in response to a first logic level of a reset signal, and the coupling comprises coupling the second driving voltage to each of the first capacitor and the second capacitor in response to a second logic level of the reset signal.

16. The driving method of claim 15, further comprising, switching the first driving voltage to the second driving voltage and applying the second driving voltage to the first capacitor and the second capacitor, in response to the reset signal performing a transition from the first logic level to the second logic level.

17. The driving method of claim 15, wherein:

the reset signal includes a region having the first logic level and a region having the second logic level in one period, and a period and a division ratio of the reset signal are the same as a period and a division ratio, respectively, of a vertical synchronization signal.

18. The driving method of claim 15, wherein:

The reset signal includes a region having the first logic level and a region having the second logic level in one period, and a period and a division ratio of the reset signal are the same as a period and a division ratio, respectively of a horizontal synchronization signal.

19. A driving device of a display panel, the driving device comprising:

a gamma voltage generator that is connected between a first node and a second node, the gamma voltage generator configured to generate a plurality of gamma voltages based on a voltage of the first node and a voltage of the second node;

a first capacitor connected between the first node and a third node;

a second capacitor connected between the second node and the third node;

a first switch that is connected to the third node, the first switch configured to switch between a fourth node that is configured to receive a first driving voltage and a fifth node that is configured to receive a second driving voltage;

a second switch connected between the first node and a sixth node that is configured to receive a maximum gamma voltage; and a third switch connected between the second node and a seventh node that is configured to receive a minimum gamma voltage.

20. The driving device of claim 19, wherein:

the first switch comprises a fourth switch connected between the third node and the fourth node, and a fifth switch connected between the third node and the fifth node.

* * * * *